INVENTOR.
ROBERT O. WINDER
BY
Samuel Cohen
Attorney

Sept. 24, 1968 R. O. WINDER 3,403,267

FLIP-FLOP EMPLOYING THREE INTERCONNECTED MAJORITY-MINORITY LOGIC GATES

Filed Sept. 24, 1965 2 Sheets-Sheet 2

INVENTOR.
ROBERT O. WINDER
BY
Attorney 3,403,267
Patented Sept. 24, 1968

3,403,267

FLIP-FLOP EMPLOYING THREE INTERCONNECTED MAJORITY-MINORITY LOGIC GATES

Robert O. Winder, Trenton, N.J., assignor to Radio Corporation of America, a corporation of Delaware Filed Sept. 24, 1965, Ser. No. 490,052
11 Claims. (Cl. 307—289)

This invention relates to a new and improved logic circuit which is useful as a binary counter or a triggerable flip-flop, or a so-called "J-K" flip-flop.

An object of the invention is to provide a circuit of the above type which is relatively simple and relatively fast.

Another object of the invention is to provide a circuit of the above type employing threshold logic stages, in particular, majority-minority gates.

Another object of the invention is to provide a register or binary counter the stages of which can be directly loaded from a bus, without requiring input gates between the bus and the respective circuit stages.

A circuit according to the invention employs three majority gates. Each gate receives both a feedback signal from its own output and signals from the other two gates. In addition, the first and second gates each may receive a control signal indicative of a binary digit and both receive, in parallel, input signals (the pulses to be counted, in the case of a counter). The output produced by the third gate is at a frequency one-half that of the input signals.

The circuit is discussed in greater detail below and is shown in the following drawings of which:

In the circuit of the invention, electrical signals representing binary digits are applied to electrical circuits which produce output signals representing binary digits.

For the sake of brevity, the input and output signals are referred to as bits having the value "1" or "0" as the case may be. While either level of signal may represent the bit "1," it is assumed arbitrarily, for purposes of the present discussion, that a relatively high level signal represents a "1" and a relatively low level signal a "0."

Figure 1:
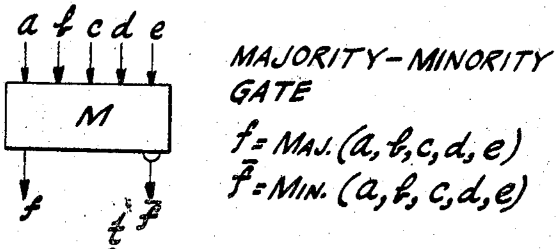
FIGURE 1 is a block circuit diagram of a majority-minority gate.

The circuit of FIGURE 1 is a majority-minority gate. Such a gate has an odd number of inputs, 5 in the example illustrated. The output $f$ produced is equal in value to the value of the majority of the inputs $a$, $b$, $c$, $d$, $e$. $\bar{f}$ is the complement of $f$ and is equal in value to the value of the minority of the inputs. For example, if any 3, or any 4, or 5 of the inputs have the value "1," then $f$ has the value "1" and $\bar{f}$ the value "0."

Figure 3:
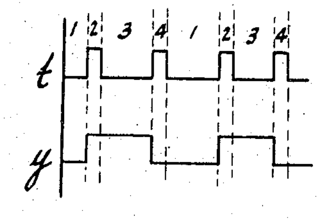
FIGURE 3 is a drawing of waveforms present in the circuit of FIGURE 3.

The majority-minority gate of FIGURE 1 may be implemented in many different ways. An example suitable for the present application is shown in FIGURE 3 of Patent No. 3,113,206, issued Dec. 3, 1963 to A. Harel. Another example, suitable with minor modification for use in the present application, appears in FIGURE 3 of application Ser. No. 378,695, filed June 29, 1964 by T. R. Mayhew and assigned to the same assignee as the present invention now U.S. Patent 3,317,753. The circuit shown in this figure is a majority gate. The circuit may be modified by adding a transistor circuit 92″, 88″, 94″, 96″, 98″ identical to the circuit in FIGURE 3 of the Mayhew application identified by the same numbers with a single prime, connecting the base 88″ of the new circuit to the existing circuit point 82′ (a collector). In this modified circuit, the majority output is available at the collector 94′ and the minority output at the collector 94″.

Figure 2:
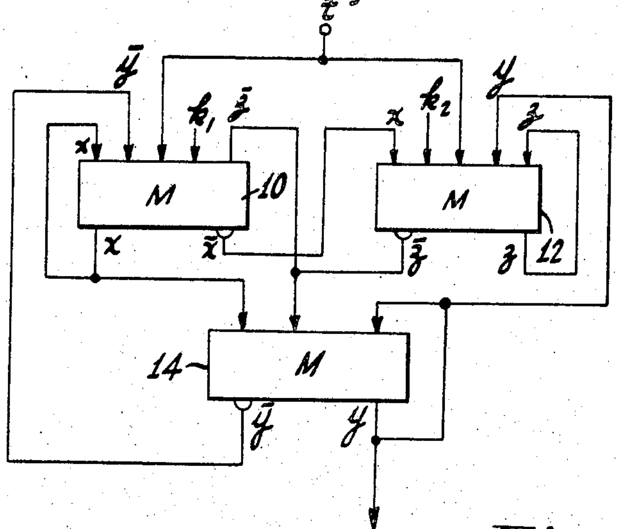
FIGURE 2 is a block circuit diagram of a logic circuit according to the invention.

The logic circuit of FIGURE 2 includes 3 majority-minority gates 10, 12 and 14. The majority output of each gate is applied back to the input to that gate. In addition, the majority output $x$ of gate 10 is applied as an input to gate 14 and the majority output $y$ of gate 14 is applied as an input to gate 12. The minority output $\bar{x}$ of gate 10 is applied as an input to gate 12; the minority output $\bar{z}$ of gate 12 is applied as an input to gates 10 and 14; the minority output $\bar{y}$ of gate 14 is applied as an input to gate 10. The control signal $k_1$ is applied to gate 10; the control signal $k_2$ is applied to gate 12. Trigger pulses $t$ are applied to gates 10 and 12.

The table below and the waveforms of FIGURE 3 explain the operation of the circuit of FIGURE 2.

TABLE I

| | | 1 | 2 | | 3 | 4 | | 5 | Set y | | 2 | Reset y | | | Return $k_2$ to 0 and t to 0 | |
|---|---|---|---|---|---|---|---|---|---|---|---|---|---|---|---|---|
| | t | 0 | 1 | | 0 | 1 | | 0 | 0 | | 1 | | | | +0 | |
| 10 | $k_1$ | 0 | 0 | 0 | 0 | 0 | 0 | 0 | +1 | 1 | 0 | 0 | 0 | 0 | 0 | 0 |
| | $\bar{z}$ | 1 | 1 | 1 | 1 | +0 | 0 | +1 | 1 | 1 | 1 | +0 | 0 | 0 | 0 | +1 |
| | $\bar{y}$ | 1 | 1 | +0 | 0 | 0 | 1 | 1 | 1 | +0 | 0 | 0 | 0 | +1 | 1 | 1 |
| | x | 0 | +1 | 1 | +0 | 0 | 0 | 0 | +1 | 1 | 1 | 1 | +0 | 0 | 0 | 0 |
| | t | 0 | 1 | | 0 | 1 | | 0 | 0 | | 1 | | | | +0 | |
| 12 | $k_2$ | 0 | 0 | 0 | 0 | 0 | 0 | 0 | 0 | 0 | 0 | +1 | 1 | 1 | +0 | 0 |
| | $\bar{x}$ | 1 | +0 | 0 | +1 | 1 | 1 | 1 | +0 | 0 | 0 | 0 | 1 | 1 | 1 | 1 |
| | y | 0 | 0 | +1 | 1 | 1 | +0 | 0 | 0 | +1 | 1 | 1 | 1 | +0 | 0 | 0 |
| | z | 0 | 0 | 0 | 0 | +1 | 1 | +0 | 0 | 0 | 0 | +1 | 1 | 1 | 1 | +0 |
| 14 | x | 0 | +1 | 1 | +0 | 0 | 0 | 0 | 1 | 1 | 1 | 1 | +0 | 0 | 0 | 0 |
| | $\bar{z}$ | 1 | 1 | 1 | 1 | +0 | 0 | 1 | 1 | 1 | 1 | +0 | 0 | 0 | 0 | +1 |
| | y | 0 | 0 | +1 | 1 | 1 | +0 | 0 | 0 | +1 | 1 | 1 | 1 | +0 | 0 | 0 |

+Denotes a change in value.

Column 1 in the table above represents in arbitrarily assumed initial condition of the circuit of FIGURE 2. $t$, $x$, $z$ and $y$ are all "0." $k_1$ and $k_2$ are also "0." Column 2 in the table indicates that two different stages change their state, in sequence, when $t$ changes from "0" to "1." The left half of column 2 indicates the first occurring event and the right half of column 2 indicates the next occurring event. In more detail, when $t$ changes to a "1" three of the five inputs, namely $t$, $\bar{z}$ and $\bar{y}$ to gate 10 are "1" so that the output $x$ changes from "0" to "1." The $\bar{x}$ input to gate 12 changes from "1" to "0" and the $x$ input to gate 14 changes to "1." The three inputs to gate 14 are now $x=1$, $\bar{z}=1$, $y=0$. Accordingly, $y$ must change from "0" to "1," as indicated in the second half of column 1. With this change, the condition of the circuit stabilizes. Three of the inputs to gate 10 are a "1" and its output $x$ is "1." Three of the inputs to gate 12 are "0" and its output $z$ is "0." The three inputs to gate 14 are "1" and its output $y$ is "1."

Column 3 in the table above shows what occurs when the trigger signal changes from "1" back to "0." The three inputs $t$, $k_1$ and $\bar{y}$ to gate 10 are now "0" so that the output $x$ of the gate changes from "1" to "0." Correspondingly, the input $\bar{x}$ to gate 12 changes to a "1" and the input $x$ to gate 14 changes to "0." Again, the condition of the circuit is stabilized.

The circuit operation depicted in columns 4 and 5 is believed to be clear from the explanation already given. Column 5 shows that the third $t=0$ signal places the circuit back in its original condition shown in column 1 so that columns 1–4 represent one complete cycle of operation. It may also be observed from FIGURE 3 that the output frequency at $y$ is one-half the input frequency at $t$.

The circuit of FIGURE 2 may be set, that is, the value of $y$ unconditionally changed to a "1" by changing $k_1$ to a "1." This is illustrated, by way of example, in the two columns "5" and "Set $y$." Column 5 is the initial circuit condition and in this condition $y$ is "0." $t$ also happens to be "0." If now $k_1$ is changed to a "1," three of the five inputs to gate 10, namely inputs $k$, $\bar{z}$ and $\bar{y}$ are "1" so that the output $x$ changes from "0" to "1." This is depicted in the left half of column "Set $y$." When $x$ changes to "1" two of the three inputs to gate 14, namely $x$ and $\bar{z}$ both are "1" so that the output $y$ of this gate changes to "1." This is the operation required. $k_1$ may now be changed back to "0" and this causes $x$ to change to "0."

If the value of $y$ is a "1" the circuit can be unconditionally reset, that is, $y$ changed from "1" to "0" by changing $k_2$ from "0" to "1." The circuit can thereafter be returned to its original condition by changing $t$ to '0" (if it is not already "0") and changing $k_2$ back to "0." This operation is depicted in the last part of the table above. Column 2 shows, by way of example, a circuit state in which $y$ is "1." In this particular example, $t$ happens to be "1" also. When $k_2$ is changed from "0" to "1," first $z$ is changed to "1," then $x$ is changed to "0," then $y$ is changed to "0." All of this is illustrated in the three sections of the column legended "Reset $y$." Thereafter, if $t$ is changed to "0" and $k_2$ is changed to "0," $z$ changes to "0," $x$ is already "0" and $y$ is already "0." Thus, the circuit has returned to its original state, the same state as shown in column 1.

From the explanation above, the use of the circuit as a triggerable flip-flop should be clear. The common terminal receiving the input pulses $t$ is the trigger terminal; the terminal to which the control signal $k_1$ is applied, is the set (S) terminal; the terminal to which the control signal $k_2$ is applied is the reset (R) terminal.

A "J-K" flip-flop is one which operates in accordance with the following truth table:

| J | K | Flip-Flop State (y=?) |
|---|---|---|
| 0 | 0 | Remains the same. |
| 1 | 0 | 1. |
| 0 | 1 | 0. |
| 1 | 1 | Changes. |

The circuit of FIGURE 2 does operate in this manner, where $k_1=J$ and $k_2=K$, provided that in the operation depicted in the fourth row of the table, the inputs $J=K=1$ change back to $J=0$, $K=0$. It already has been shown that the circuit operation depicted in the first three rows does occur. With respect to the last row, if $k_1=k_2=1$ and $t=0$, these signals affect the circuit in the same manner that $t$ does when $k_1=k_2=0$. As can be seen from Table I, when $k_1=k_2=0$, if $t$ changes from "0" to "1," $y$ changes its value. Therefore, if $t$ is "0" and $k_1=k_2=0$ changes to $k_1=k_2=1$, $y$ changes its value. When $k_1$ and $k_2$ change back to "0," $y$ does not change.

If $t=1$ and $k_1=k_2$ is changed to "1" then back to "0," $y$ changes its state. This may be shown, for example, by assuming the initial circuit condition to be that depicted in the right half of column 2 of Table I. $y$ is initially "1." The change of $k_1$ and $k_2$ to "1" initially causes $z$ to change to "1" and $x$ and $y$ to remain "1." When $k_1$ and $k_2$ both return to "0," $x$ and $y$ change to "0" and $z$ remains "1." By the same token, if the initial conditions are those depicted in the right half of column 4 of Table I ($y$ is initially "0"), the change of $k_1$ and $k_2$ to "1" causes $x$ to changes to "1," $z$ to remain "1" and $y$ to remain "0." When $k_1$ and $k_2$ are both changed back to "0," $x$ remains "1" and both $z$ and $y$ change to "0."

The circuit of FIGURE 2 is useful as a register stage. A plurality of such stages may be arranged side-by-side, each stage for storing a bit of different rank.

Figure 4:
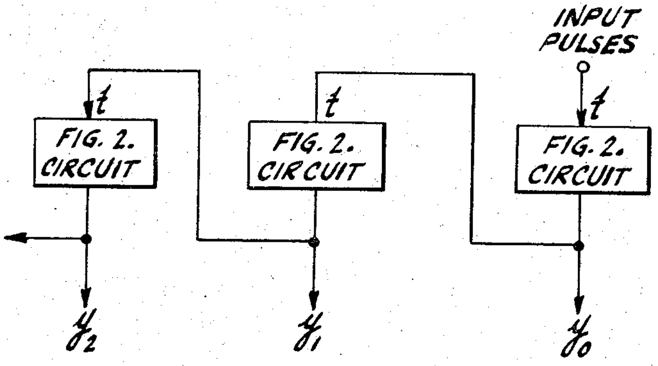
FIGURE 4 is a block circuit diagram of a three stage counter according to the invention.

A three stage counter according to the invention is illustrated in FIGURE 4. Each block in FIGURE 4 is the circuit of FIGURE 2. The $y$ output of each block is applied to the $t$ input of the following block. The operation of the circuit is believed to be self-evident, each stage producing an output at one-half the frequency of the input it receives.

Figure 5:
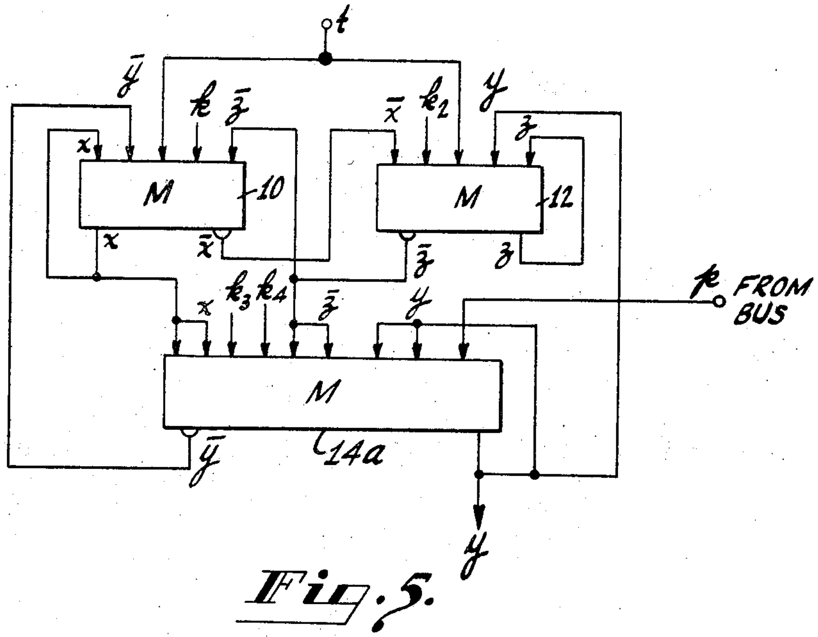
FIGURE 5 is a block circuit diagram of a modified logic circuit according to the invention.

The modified circuit of FIGURE 5 operates in the same way as the circuit of FIGURE 2. However, the circuit of FIGURE 5 has the additional feature that a digit present on a bus can be transferred directly into the circuit without the need for a gate positioned between the circuit and the bus.

The circuit of FIGURE 5 comprises gates 10 and 12 which are identical to the correspondingly numbered gates of FIGURE 2 and a nine input majority-minority gate 14$a$ in place of the gate 14 of the circuit of FIGURE 2. There are two $x$ inputs, two $\bar{z}$ inputs and two $y$ inputs to gate 14$a$. In addition, there are control inputs $k_3$ and $k_4$ and there is a ninth input $p$, the bit from the bus. When $k_3$ is not equal to $k_4$, that is, when $k_3=1$ and $k_4=0$, or when $k_3=0$ and $k_4=1$, the circuit operates in exactly the same way as the circuit of FIGURE 2. The $p$ input has no effect. For example, if $x$ and $\bar{z}$ are both "1," $y$ will be "1" regardless of whether $p$ is "1" or "0."

To transfer a bit $p$ into the circuit of FIGURE 5 first the circuit is reset. This is accomplished by changing $k_2$ back to "0" and, if $t$ is a "1," changing $t$ back to "0" also. The circuit reset operation is identical to that described in connection with FIGURE 2 in that $x$, $y$ and $z$ all become "0." In this condition of the circuit, the two $x$ inputs cancel the effect of the two $\bar{z}$ inputs.

Now $k_3$ and $k_4$ are both made "1." $y$, it will be recalled, is a "0." Accordingly, the two $y$ inputs exactly cancel the two $k$ inputs. If a $p=0$ is present on the bus for transfer into the circuit, five of the nine inputs to gate 14$a$, namely the two $x$ inputs, the two $y$ inputs and the $p$ input, are "0" so that $y$ remains "0." If a $p=1$ is present on the bus for transfer into the stage, five of the nine inputs to gate 14*a*, namely the two $\bar{z}$ inputs and the $k_3$, $k_4$ and $p$ inputs, are all "1" so that $y$ must change from "0" to "1."

Figure 6:
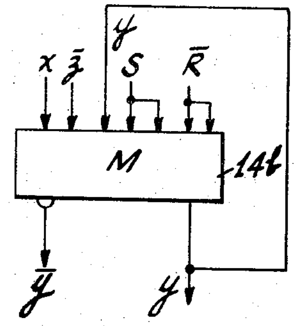
FIGURE 6 is a block circuit diagram of a portion of the circuit of FIGURE 2, in modified form.

FIGURE 6 shows another alternative for the third gate of the circuit of FIGURE 2. The gate 14*b* is a seven input gate. Three of the inputs are $x$, $\bar{z}$ and $y$, as in the previous circuit. The fourth and fifth inputs are for receiving a set (S) signal and the sixth and seventh inputs are for receiving a $\overline{\text{reset}}$ ($\bar{R}$) signal. If $S=R$, then the set inputs cancel the reset inputs and the circuit operation is unaffected. If $S=1$, $R=0$ ($S\bar{R}=1$) then four of the seven inputs are "1" and the circuit is unconditionally set to $y=1$. If $S=0$, $R=1$, then four of the seven inputs are "0" and the circuit is unconditionally reset to $y=0$.

The circuits of FIGURE 6 and of FIGURE 5 may be interconnected to provide a counter in the same way as is shown in FIGURE 4. They may also be arranged to provide a storage register.

What is claimed is:

1. A logic circuit comprising, three majority-minority gates; means for applying to each gate its own majority output, and outputs from the other two gates, respectively; means for supplying control inputs to the first and second gates; and means for concurrently applying input pulses to the first and second gates.

2. A logic circuit as set forth in claim 1, wherein the first and second gates are five input gates and the third gate is a three input gate.

3. A logic circuit as set forth in claim 1, wherein the first and second gates are five input gates and the third gate is a nine input gate, the outputs received by the third gate from the first gates being applied to the first and second inputs of the third gate, the outputs received by the third gate from the second gate being applied to the third and fourth inputs of the third gate, the majority output of the third gate being applied to the fifth and sixth inputs of the third gate, and further including means for applying control voltages to the seventh and eighth inputs of the third gate, and means for applying an information signal to the ninth input to the third gate.

4. A logic circuit comprising, three majority-minority gates; means for applying the majority output of each gate to one of its inputs; means for applying the minority output of each gate to at least one other gate; means for applying control voltages to the first and second of the gates; means for concurrently applying input pulses to the first and second gates; and a circuit output terminal at the output of one of the gates.

5. A logic circuit comprising, three majority-minority gates; means for applying the majority output of each gate to one of its inputs; means for applying the minority output of the first gate to the second gate, the minority output of the second gate to the first and third gates, and the minority output of the third gate to the first gate; means for applying the majority output of the first gate to the third gate and the majority output of the third gate to the second gate; means for applying control voltages to the first and second of the gates; means for concurrently applying input signals to the first and second gates; and the third of said gates providing the output of the circuit.

6. The circuit of claim 5 wherein the inputs received by the third gate from the first, second and third gates are weighted twice as heavily as the respective inputs to the first and second gates, and further including means for applying control signals and means for applying an information signal to the third gate.

7. A logic circuit comprising, three majority gates, the first producing majority and minority outputs $x$ and $\bar{x}$, respectively, the second producing majority and minority outputs $z$ and $\bar{z}$, respectively, and the third producing majority and minority outputs $y$ and $\bar{y}$, respectively; means for applying said outputs to said gates in the following manner:

$x$, $\bar{y}$ and $\bar{z}$ to the first gate;
$\bar{x}$, $y$ and $z$ to the second gate; and
$x$, $y$ and $\bar{z}$ to the third gate;

means for individually applying control signals to the first and second gates; and means for concurrently applying input signals to the first and second gates.

8. A logic circuit as set forth in claim 7, and further including means for applying control signals and an information signal to the third gate.

9. A logic circuit comprising, three majority-minority gates, means for applying to each gate its own majority output, and outputs from the other two gates, respectively; and means for concurrently applying input signals indicative of binary digits to the first and second gates.

10. A logic circuit comprising, three majority-minority gates, means for applying to each gate its own majority output, and outputs from the other two gates, respectively, means for supplying control inputs to the first and second gates, means for concurrently applying input signals indicative of binary digits to the first and second gates; a set input terminal at the third gate; and a reset input terminal at the third gate.

11. A logic circuit comprising, three majority gates, the first producing majority and minority outputs $x$ and $\bar{x}$, respectively, the second producing majority and minority outputs $z$ and $\bar{z}$ respectively, and the third producing majority and minority outputs $y$ and $\bar{y}$, respectively; means for applying said outputs to said gates in the following manner:

$x$, $\bar{y}$ and $\bar{z}$ to the first gate;
$\bar{x}$, $y$ and $z$ to the second gate; and
$x$, $y$ and $\bar{z}$ to the third gate;

means for individually applying control signals to the first and second gates; means for concurrently applying input signals indicative of binary digits to the first and second gates; means for applying an input to the third gate at twice the weight of the $x$, $y$ or $\bar{z}$ input to the third gate; and means for applying a reset input to the third gate at twice the weight of the $x$, $y$ or $\bar{z}$ input to the third gate.

References Cited

UNITED STATES PATENTS

| | | | |
|---|---|---|---|
| 3,178,590 | 4/1965 | Heilweil | 307—289 |
| 3,234,401 | 2/1966 | Dinman | 307—289 |

JOHN S. HEYMAN, *Primary Examiner.*